106-84    AU 113    EX
1/5/82    OR    4,309,220

United States Patent [19]
Hivert et al.

[11] 4,309,220
[45] Jan. 5, 1982

[54] INORGANIC ADHESIVE FOR ASSEMBLING METALLIC COMPONENTS

[75] Inventors: André R. Hivert, Pontoise; Philippe M. Galmiche, Clamart, both of France

[73] Assignee: Office National d'Etudes et de Recherche Aerospatiales, Chatillon, France

[21] Appl. No.: 112,480

[22] Filed: Jan. 16, 1980

[30] Foreign Application Priority Data

Jan. 23, 1979 [FR] France .................. 79 01615

[51] Int. Cl.³ .............. C04B 37/02; C09D 1/02
[52] U.S. Cl. ................... 106/84; 106/286.1; 106/286.3; 106/286.5; 156/89; 264/241

[58] Field of Search ............ 106/75, 84, 286.3, 286.1, 106/286.5; 156/89; 264/241

[56] References Cited

U.S. PATENT DOCUMENTS 3,248,250  4/1966  Collins .................. 106/286.3
3,248,251  4/1966  Allen .................... 106/286.3
3,959,063  5/1976  Hawthorne ............. 106/84

*Primary Examiner*—Allan Lieberman
*Attorney, Agent, or Firm*—Abraham A. Saffitz

[57] ABSTRACT

Adhesive composition which can be transformed into a metallo-ceramic cement by heat treatment. The binder for the composition is incorporated in the binder which sodium disilicate and the powdered metallic filler is composed of a mixture of aluminium-coated stainless steel powder and ultrafine chromium powder.

7 Claims, 1 Drawing Figure

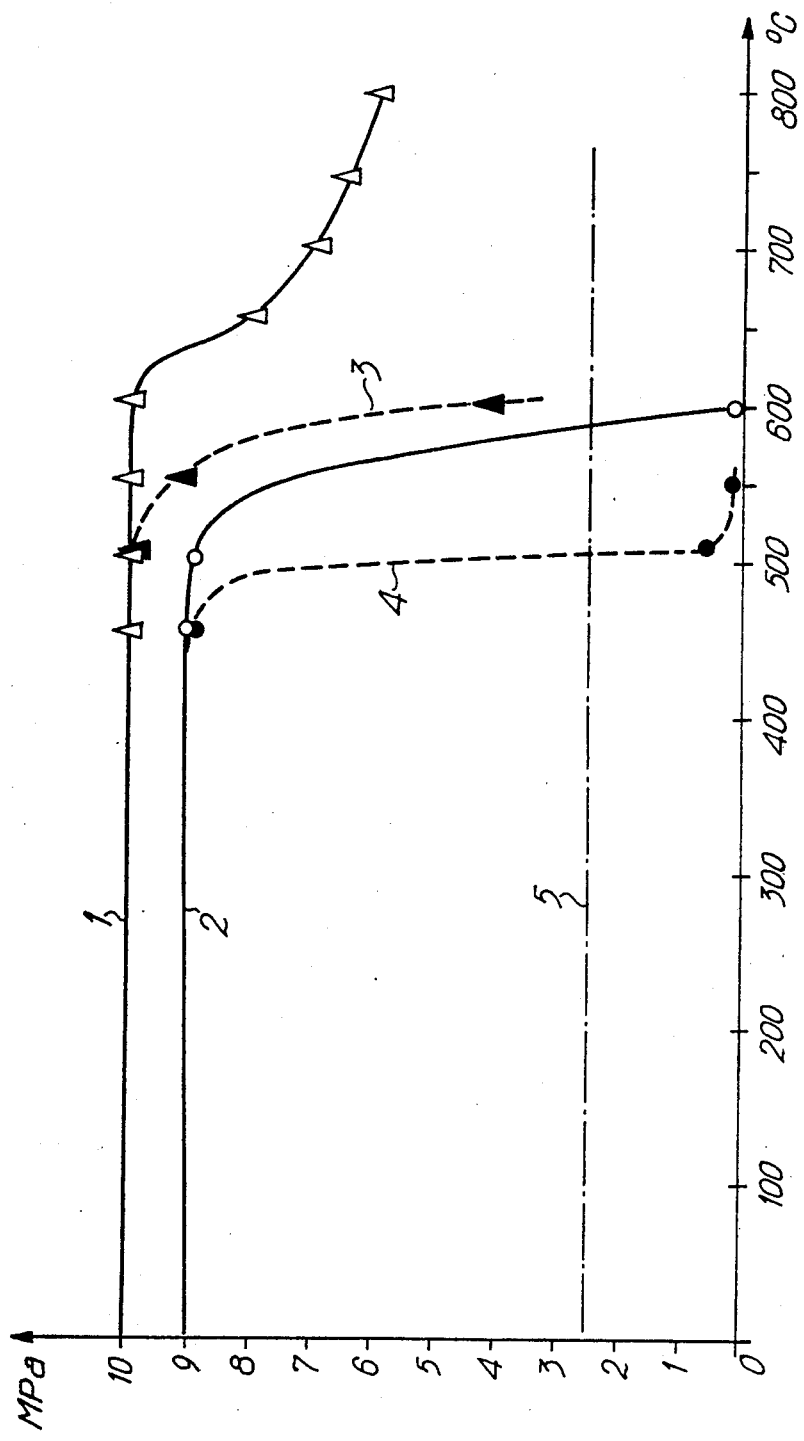

INORGANIC ADHESIVE FOR ASSEMBLING METALLIC COMPONENTS

BACKGROUND OF THE INVENTION

1. Field of the Invention

The invention concerns an inorganic adhesive composition intended for bonding porous to non-porous metallic materials. More particularly, it relates to an adhesive composition with which it is possible to achieve bonded assemblies offering high resistance to shearing when heated up to temperatures of the order of 600° C. and which are also capable of resisting repeated temperature variations (heat cycles).

The resistance to shearing at elevated temperatures which creates bonded assembly problems of this type are experienced particularly when it comes to forming a tight seal between the successive compression stages of a compressor making up part of a turboshaft engine in order to provide the seal required to improve the thermodynamic efficiency.

Turbojet manufacturers provide for the installation of sealing joints inside casings in the space separating them from the tips of the rotor blades as well as for labyrinth joints on the rotating shafts. The blade tip seals must be abradable in such a way as not to wear away the tips of the blades which are in contact with the seals, whereas the rotating shaft seals must have plastic qualities for fulfilling their role.

2. Description of the Prior Art

Several adhesive materials are suitable for making up the seals but the ones performing best, which offer the advantage of combining the abradable and plastic qualities required for both uses mentioned, are metallic felts of nickel or nickel-chromium composed of a criss-cross of hollow fibres of a few microns in diameter as described in the French Pat. No. 2,158,732 filed on Sept. 23, 1969 and the French Pat. of addition No. 2,285,475 filed Sept. 17, 1974. The extreme fineness of the pores of these felts and their high level of porosity make it possible to obtain exceptional resistance to the passage of gas while obviating damage to the opposed parts.

The peak temperatures reached by the felts secured in the casing are around 600° C., the heat cycle being dependent on the conditions of use of the engines. The secure attachment of felts to the casing wall is, thus, a problem which is difficult to solve.

One solution consists in attaching the felts by brazing, but the alloys making up the casings always contain chromium to ensure corrosion protection. This high temperature of oxide formation of this element disturbs the absorption of the brazing to such an extent that exceptional precautions, such as brazing in high vacuum or by using a balanced hydrogen-helium atmosphere, have to be taken. When the casings are on the large size, the equipment is expensive and a considerable amount of energy is consumed.

Furthermore, if a defect is turned up during inspection, the casing seal assembly often has to be scrapped, since the successive brazing operations subject the casings to overheating likely to give rise to unacceptable geometric deformations. Another solution consists in bonding the felt skin by means of a layer of inorganic adhesive such as, for example, those known under the trade mark SERMETAL OHC 732 or 481.

Products of this inorganic adhesive type contain a mineral binder giving the necessary qualities of adhesion and a powdered metallic filler generally aluminium powder based whose role is to impart plasticity to the product, after applying a suitable thermal bonding treatment, the thermal treatment enhancing the considerable plasticity allowing it to bear the stresses caused by heat.

In this solution, fixing the components of the inorganic adhesive composition is achieved by a straightforward heating process at 350° C. which transforms the product into a metallo-ceramic cement which is highly adherent and strongly resistant to heat cycles up to 450° C. This method of assembly affords many advantages, such as ease of preparation and use of the adhesive, simple and cheap equipment (clamps, oven) together with the absence of any scrap since the support component can be recovered by removing the adhesive seal upon dipping into a hot sodium solution. However, for temperatures greater than 450° C., the metallo-ceramic cement rapidly loses its adherence properties following corrosion of the aluminium filler particles.

The adhesive thus cannot solve the problems experienced in practice for attaching sealing felt in the last stages of turboshaft compressors or in the corresponding labyrinths where the temperature of the components exceeds 450° C. and can reach around 600° C.

One is thus forced to resort to the afore-mentioned brazing methods and to bear the related drawbacks.

SUMMARY OF THE INVENTION

The applicant carried out research into a new inorganic adhesive which can be used for assembling porous or non-porous metallic components for which the bonding operation comprises straightforward heat treatment at a moderate temperature and through which it is possible to form assemblies having mechanical properties at least equal to those of known products but which, in addition, retains these properties up to temperatures of around 600° C.

The purpose of the invention is, therefore, to provide an adhesive meeting these requirements, prepared with constituent parts which are readily available on the market.

The preparation of the adhesive in keeping with the invention consists in choosing a mineral binder and combining it with a powdered metallic filler satisfying the following criteria resulting from a systematic study carried out by the applicant:

expansion coefficient (k) approximate to that of the usual substrates (in this case, alloys of the iron group, based on Fe, Ni, Cr for which $k = 13$ to $18 \times 10^{-6}$);

good corrosion resistance up to about 600°/650° C. in an oxidizing atmosphere;

thermo-chemical neutrality with the binder under the conditions of use for the binder to retain its reticular structure which is the basis of its adhesive qualities;

adjustable granulometry so as to obtain optimal thickness of the seal;

ease of production and availability of the powder on the market at a reduced product cost.

An initial difficulty arises as regards these criteria as a whole because the only powders readily available are the iron based alloy powder containing 74% Fe, 18% Cr and 8% Ni, known as 18-8 stainless steel ($k = 18 \times 10^{-6}$) and the magnesia powder ($k = 13 \times 10^{-6}$) available in grain sizes of 20–150 microns.

A thorough examination of each of these powders shows that neither of these satisfies all the criteria. Indeed, the examination of the 18-8 stainless steel powder reveals that at 600° C., 47% of the powder is transformed into oxide after 100 hours and, for its part, magnesia is not totally neutral at 600° C. with regard to to sodium silicate.

The applicant was, led to making an attempt to modify the transformation for the stainless steel powder available and to search for a transformation to provide protection against corrosion when hot such that it withstands temperatures of roughly 600° C. with no notable degradation.

A further difficulty arises when it was attempted to assemble two metallic components at least one of which is made up of a highly porous material (felt consisting of a criss-cross composition of tubular fibers and whose diameter is about 10 microns) whose overall porosity can reach 95%. A felt structure such as this which is decidedly more porous and finer than any other known fibrous material allows makes for the silicate adhesive to drift due to capillary action of a major amount the sodium silicate to the interior of the felt to the detriment of the outer surfaces of the components to be bonded. The phenomenon is due to the fact that the grain size of the adhesive's powdered filler is relatively large (20 to 150 microns) and that the capillary forces within the adhesive's filler are considerably weaker than within the felt. Attempts were made, first of all, to check the drift of the adhesive's binder by filling the felt beforehand with a substance which could then be removed, such as naphthalene for example. However, the operation eventually results in the felt's poor absorption of the sodium silicate to the detriment of the adhesive bond and, finally, the felt-seal interface lacks adhesion. The applicant found it was possible to incorporate in the binder defined above a second metallic powder meeting all the criteria mentioned for the first powder but whose grain size is such that the capillary forces likely to occur in the adhesive's filler are at least equal to those likely to occur in the porous structure to be bonded, as a result of which the drift of the binder is halted. The second powder is an ultrafine chromium powder available on the market and whose grain size lies between 0.5 and 3 microns.

The adhesive composition forming the subject of this invention, comprises a sodium silicate solution and a metallic powdered filler and it is characterized in that the filler is made up of a mixture of a stainless steel powder having a granulometry between 20 and 150 microns, the grains of which are coated with a superficial layer of an aluminium-based diffusion alloy, and an ultrafine chromium powder having a granulometry lying between 0.5 and 3 microns. A disilicate colloidal solution ($Si_2O_5Na_2$) was selected as a sodium silicate solution which can be altered to obtain a proportioning of dry extract measured after calcination at 600° C. lying between 30 and 38% and preferably of 35%. The powdered filler is composed of a mixture of 18-8 stainless steel powder and ultrafine chromium powder, the proportion by weight of the chromium powder being between 15 and 40% and preferably 35% of the total weight of the filler.

The concentration of powdered filler in the adhesive in accordance with the invention, is adjustable in terms of the consistency desired for the applications envisioned, especially in terms of the state of the surface and of the structure of the parts to be assembled. It was found that good results are achieved in all cases of application with a weight proportion of filler ranging from 72 to 78%, the proportion covering the majority of applications being 75%.

BRIEF DESCRIPTION OF THE DRAWING

The invention will now be disclosed in detail according to several particular examples and in relation to the accompanying drawing in which the single FIGURE represents the shearing resistance of two metal sheets bonded by the adhesive according to the invention. The shearing resistance is expressed in Mega-Pascals (i.e. $10^6$ Newtons per $m^2$) versus temperature expressed in °C.

DESCRIPTION OF THE PREFERRED EMBODIMENTS

EXAMPLE 1

Transformation of the stainless steel powder to produce a coated heat resistant powder.

A mixture is prepared consisting of:
400 g of stainless steel powder (grain size from 20 to 150 microns-composition: Fe 74%, Cr. 18%, Ni 8%);
440 g of aluminium powder (grain size from 5 to 20 microns);
20 g of magnesia powder (grain size of 100 microns);
40 g of aluminium chloride $AlCl_3$.

The mixture is placed in an iron box fitted with a semi-tight cover. The box is then put in an oven at 550° C. for 4 hours, in a hydrogen atmosphere and, next, in a separate chamber for cooling down, in a hydrogen atmosphere, and the powder is removed from the box. Lastly, it is washed with distilled water to eliminate any traces of halide. The aluminum supply is checked using a test sample, comprising a sheet of stainless steel of the same composition as the powder, placed in the oven at one and the same time. The sample undergoes a weight increase of 0.3 mg/cm² which corresponds, for the treated powder, to a diffusion coating of aluminium having a thickness around 2 microns.

EXAMPLE 2

Preparation of the adhesive (a) binder: a measurement is made of the dry extract weight from a weighed quantity of a colloidal solution of sodium silicate available on the market which is progressively calcinated up to 600° C. The dry extract weight generally lies around 40% of the colloidal solution. A sufficient quantity of water is added to bring this value to 35% while stirring to give a homogenous solution.

(b) powdered filler: stainless steel powder which has undergone the treatment as per example 1 is mixed with ultrafine chromium powder (of a 0.5 to 3 micron grain size) of a magneso-thermic or electrolytic origin, in a proportion of 65% stainless steel powder to 35% chromium powder by weight.

(c) mixture: the quantity of colloidal solution as per (a) required for coating the parts to be bonded is taken and weighed and to it is added the powdered filler as per (b) until a weight concentration equal to 75% of the weight of the mixture is obtained. This is mixed together until a consistent paste is obtained.

The adhesive thus prepared is ready for use and keeps for around 3 hours.

EXAMPLE 3

Assembling a nickel-chromium felt of 80% porosity onto a sheet of 18-8 stainless steel The sheet is prepared by dry-sanding using 500 microns alumina particles.

The felt is de-greased with methylene chloride and carefully dried.

The adhesive prepared as per example 2 is spread on the felt with a brush and any excess is removed by scraping the surface with a spatula. A layer of adhesive about 1 mm thick is spread onto the sanded sheet of metal. The felt is positioned on the metal sheet and the two pieces are held together with blocks and clamps with these being adjusted by tightening so as to obtain a pressure of 0.5 kg/cm². The assembly is kept at the ambient temperature for 16 hours. Once the adhesive is set, the clamps and blocks are removed and the parts are placed in an oven at 80° C. for 6 hours. The oven temperature is then raised to 110° C. and hendl there for 5 hours. Over 1 hour, the temperature is raised to 350° C. and held steady for 30 minutes.

After cooling, the seal formed has the look of a thin, compact layer of a dark grey colour whose depth is around 250 to 300 microns. The seal thus obtained is immune to boiling water and various solvents (hydrocarbons, acetone, benzene, etc.) as well as mineral oils and hydraulic fluids. It can withstand the extremely severe thermal shocks resulting from cooling the assembled parts down from 600° C. in a jet of compressed air at 25° C. and this operation can be repeated several hundred times without producing any alteration in the bonding.

If need be, the two assembled parts can be separated by immersion in a boiling concentrated sodium solution for several hours.

EXAMPLE 4

As per example 3, but the backing piece is a nickel-based super-alloy containing Cr 22%, Fe 18%, Co 1.5%, W 0.6%, Mo 9% known under the trade name of Hastelloy X; the same method is carried out giving identical results.

EXAMPLE 5

As per example 3, but the backing piece is in a steel containing 13% chromium-identical results.

EXAMPLE 6

Bonding two sheets of non-porous 18-8 stainless steel together. The sheets are prepared and bonded, as per example 3.

Set out hereafter, in relation with the only graph hereto, are the results of comparative tests made on series of identical test samples each comprising 2 sheets of 18-8 stainless steel bonded together using, on the one hand, the adhesive in keeping with the invention as per example 6 and, on the other hand, the inorganic adhesive of the former state of the art (OHC 732 already mentioned) by applying the heat treatment recommended by the manufacturer.

In the FIGURE, curves 1 and 2 relate to the measurements of the resistance to shearing taken after stabilizing for 2 hours at the temperature indicated for the adhesive as per the invention and that of the former art respectively. The values for the two adhesives virtually concur up to a temperature of around 500° C. but curve 2 then rapidly drops away whilst curve 1 keeps its value up to 600° C.

Curves 3 and 4 relate to behavior tests carried out on test samples which have undergone 240 hours' aging at the temperatures indicated and during which 25 thermal shocks were induced by sudden cooling in a jet of compressed air at 25° C. Curve 3 shows the measurements taken for the adhesive as per the invention for temperatures of 500° C., 550° C. and 600° C. and curve 4 is for the adhesive of former art for temperatures of 450° C., 500° C. and 550° C.

The 240 hour period chosen for the aging tests corresponds, under the normal operating conditions of a turboshaft engine, to several thousands hours' use since the duration of the temperature peaks reached is relatively short.

Curve 5 gives, as a guide, the shearing-resistance value of an 80-20 Ni-Cr felt with 80% porosity.

Examination of these curves shows that the adhesive as per the invention affords appreciable technical progress as it offers a resistance to shearing higher than that of known products and which always remains higher than the resistance itself of the felt to be bonded.

We claim:

1. Inorganic adhesive composition for bonding porous to non-porous metal structural components by means of heat treatment converting the adhesive compound into a metallo-ceramic cement, said adhesive composition comprising:
   a sodium disilicate binder;
   a powder metallic filler made up of a mixture of stainless steel powder having a grain size lying between 20 and 150 μm, the grains of which are coated with a superficial layer of a diffusion alloy containing aluminium, and of the total weight of the filler being 15-40% ultrafine chromium powder having a grain size lying between 0.5 and 3 μm.

2. Inorganic adhesive composition as set forth in claim 1 in which the proportion by weight of the chromium powder in the powder metallic filler is about 35%.

3. Inorganic adhesive composition as set forth in claim 1, in which the granulometric fraction of the stainless steel powder included between 100 and 150 μm represents 10 to 30% of the weight of the stainless steel powder.

4. Inorganic adhesive composition as set forth in claim 1 wherein the sodium disilicate binder is a sodium disilicate solution giving when calcinated up to 600° C. a dry extract whose weight proportion is substantially 35% of the solution weight.

5. Inorganic adhesive composition as set forth in claim 1 wherein the proportion by weight of the powder metallic filler lies between 72 and 78%.

6. Inorganic adhesive composition as set forth in claim 1 wherein the coating of the grains of the stainless steel powder by the diffusion alloy containing aluminium is substantially about 2 μm thick.

7. Inorganic adhesive composition as set forth in claim 1 wherein the coating of the grains of the stainless steel powder by the alloy containins aluminium results from diffusing said alloy on said powder at 550° C. during 4 hours in a hydrogen-chlorine atmosphere.

* * * * *